May 28, 1968   D. E. STROMBERG   3,385,144
CUTTING TOOL MOUNTING APPARATUS FOR LATHES AND THE LIKE
Filed April 22, 1966   2 Sheets-Sheet 2
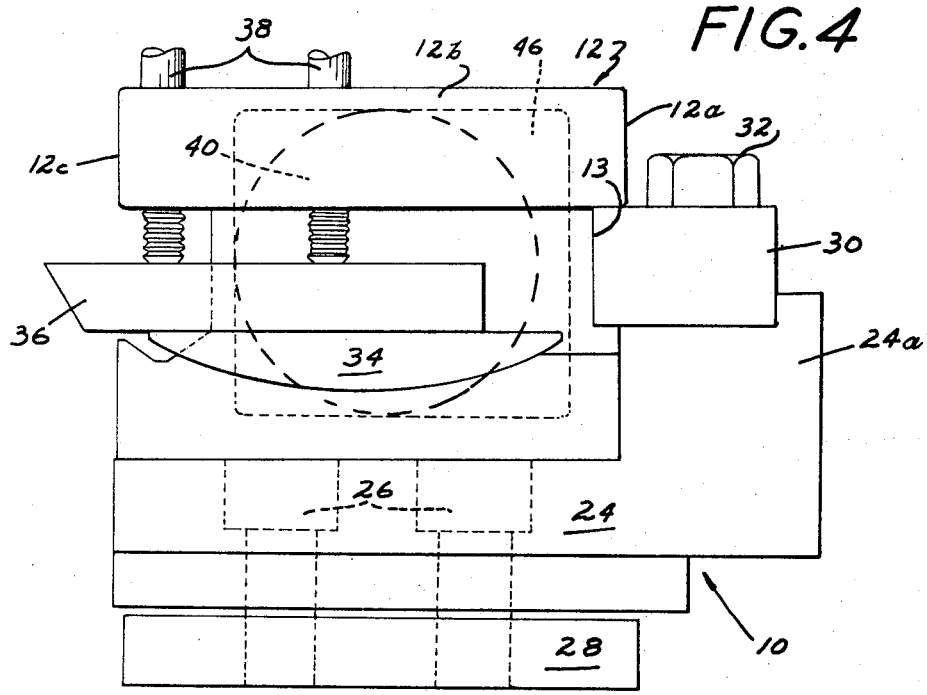
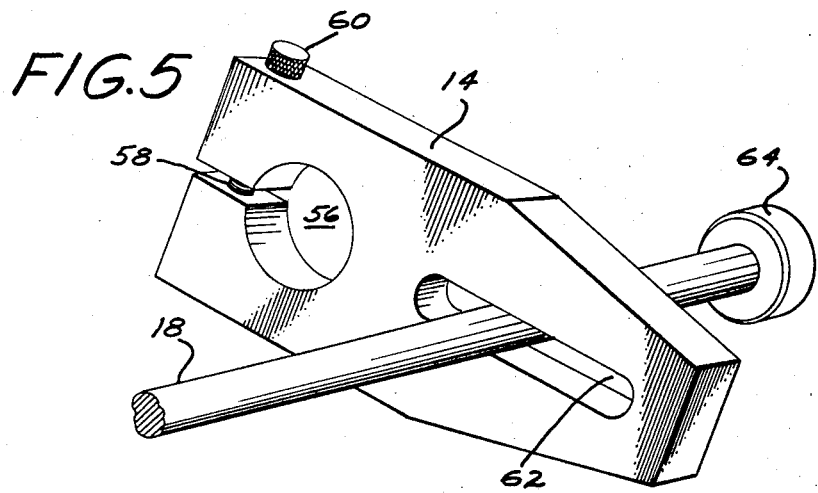
INVENTOR.
DAVID E. STROMBERG
BY
ATTORNEYS United States Patent Office 3,385,144
Patented May 28, 1968

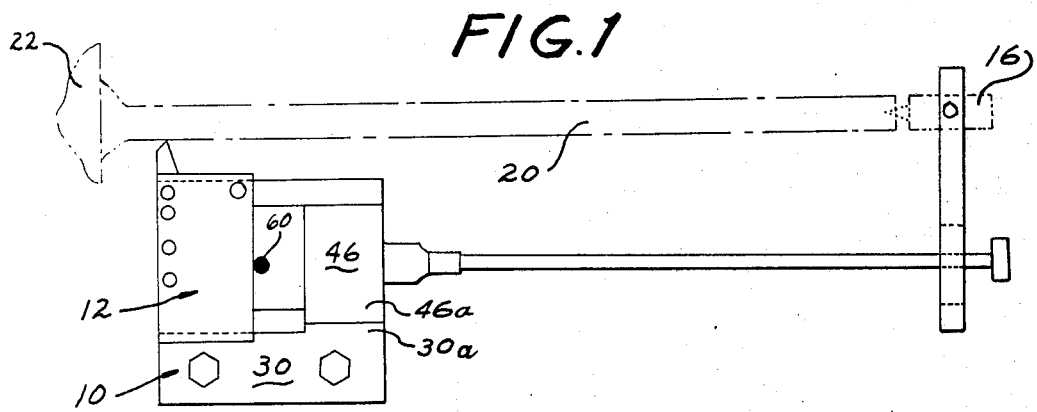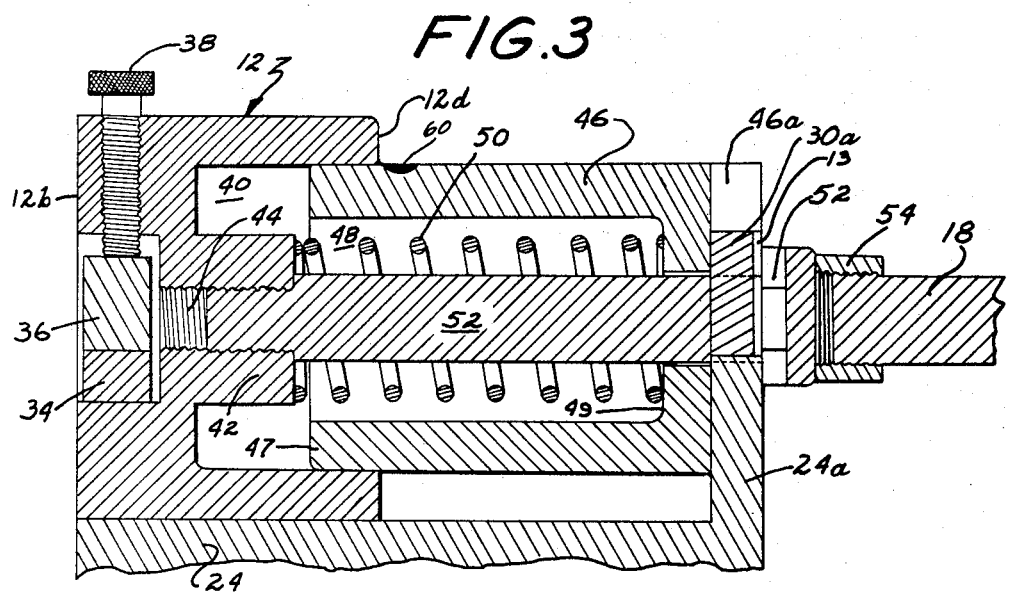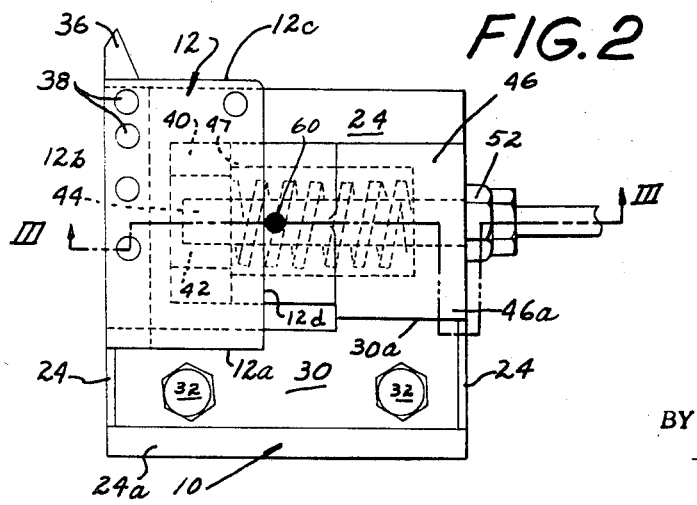

3,385,144
CUTTING TOOL MOUNTING APPARATUS FOR
LATHES AND THE LIKE
David E. Stromberg, Traverse City, Mich., assignor to
Stromberg Tool Company, Traverse City, Mich., a corporation of Michigan
Filed Apr. 22, 1966, Ser. No. 544,524
9 Claims. (Cl. 82—24)

ABSTRACT OF THE DISCLOSURE

A cutting tool-mounting attachment for engine lathes including a base which is attachable to the carriage portion of the lathe and a tool-mounting member which is slidably carried on the base and spring-biased on the base into a normal position where the cutting tool carried thereby is advanced along the workpiece by the carriage for normal cutting operation, and further including a stop means in the form of a rigid link coupled to the tool-holding member and extending along the lathe for direct contact with an abutment means in the form of a stop or abutment fixedly secured with respect to the lathe, such that upon direct contact of the stop means and the aforesaid abutment, the tool-holding member is stopped at a predetermined position along the workpiece whereas the base structure secured to the carriage portion is allowed to continue onward with the carriage portion by overcoming the biasing spring between the base and the tool-holding member, such that the lathe can be run at high speed while cutting threads or the like into the workpiece without danger of running the cutting tool past the desired point on the workpiece.

---

This invention relates to metal-working lathes and to accessory devices and apparatus used in operating such lathes, and more particularly it relates to a novel cutting tool mounting apparatus for use on lathes which provides high-speed thread-cutting operation thereof, regardless of the particular type of workpiece or the particular location thereof upon which threads are to be formed.

The cutting of threads upon a workpiece by the use of a lathe has long been known and practiced by skilled operators. Thread-cutting is normally carried out at relatively low speeds, since the operation must frequently be stopped in order to take measurements. Further, extreme care must be exercised when threading the workpiece near the face plate or chuck of the lathe in order to make certain that the cutting is stopped at the precise desired place, and also to prevent running the cutting tool into the shoulder which is usually present at the extreme end of the workpiece, or even into the face plate of the lathe, which not infrequently occurs despite the degree of care exercised. Thus, thread-cutting is a relatively tedious and expensive operation. Further, due to the low cutting speed normally employed, the finish of the completed threads is typically of a rough nature which in many instances is very undesirable and objectionable, but is more acceptable than the extreme high cost of custom grinding and polishing which would be necessary to provide better finishes.

Accordingly, it is a major objective of the present invention to provide an apparatus attachable to a typical lathe by which high-speed thread-cutting operation may be practiced over any particular area of the workpiece, including that portion immediately adjacent the face plate of the lathe, thereby greatly conserving the time required for such operation and also providing very significant improvements in the resulting finish of the thread, which more frequently resembles a ground surface than one cut by a lathe.

A further important object of the invention is to provide an apparatus of the foregoing nature in which the allowable length of travel of the cutting tool may be accurately preset before the cutting operation begins, and by means of which the cutting tool automatically ceases its travel along the bed of the lathe at a predetermined point, while the carriage is allowed to continue to be driven in the usual manner, thereby eliminating the high degree of care previously required to be exercised by the lathe operator.

Additional objects of the invention, together with the many advantages provided thereby, will become increasingly apparent following consideration of the ensuing specification and its appended claims, particularly when taken in conjunction with the accompanying illustrative drawings setting forth a preferred embodiment of the apparatus.

In the drawings:

FIG. 1 is an overhead plan view of the novel apparatus, showing in phantom certain environmental portions of a typical lathe;

FIG. 2 is an enlarged, detailed, fragmentary plan view of the cutting tool-holding portion of the apparatus;

FIG. 3 is a sectional side elevation of the apparatus of FIG. 2, taken through the vertical plane III—III thereof;

FIG. 4 is an end elevation of the structure shown in FIG. 2; and

FIG. 5 is a fragmentary perspective view of another portion of the apparatus seen in FIG. 1.

Referring now in more detail to the drawings, the complete apparatus is seen in FIG. 1 to include generally a base structure 10, a cutting tool-holding means 12 mounted upon the base structure, an abutment means 14 which is securable to the tailstock portion of the lathe indicated at 16, and a stop means 18 which extends from the tool-holding means 12 (in a manner to be shown subsequently) to the abutment means 14, for engagement therewith under prescribed conditions. In order to show the typical working relation with a lathe, an exemplary workpiece 20 is indicated which extends from the tailstock 16 to the chuck 22 of a typical lathe headstock. As will be understood, the basic elements making up a typical lathe are so well known that they need not be shown here, although it will be recognized that all such lathes include a carriage portion to which the cutting tool is usually attached as by a tool post, with the carriage being driven parallel to the workpiece by a long, helically threaded screw device commonly called a lead screw, whose axis lies parallel to the workpiece and bed of the lathe and represents what is referred to herein as the drive axis of the lathe.

The base structure 10 of the apparatus is seen from FIGS. 2, 3, and 4 to comprise an assembly including a base plate 24 which is generally rectangular when seen in plan (FIG. 2) and which is somewhat L-shaped in lateral cross section (FIG. 4) so as to have an upraised retaining portion 24a, against which the outer side 12a (i.e., that side opposite the workpiece 20) of the cutting tool-holding means 12 may rest. The base plate 24 is drilled and counterbored so that a pair of bolts such as 26 may be used to secure an anchor plate 28 beneath the base plate (FIG. 4). It is by means of the anchor plate 28 that the entire base structure and cutting tool-holding apparatus is mounted upon a given lathe, by securing the anchor plate to the carriage portion of the lathe, in the same manner that the tool post is usually secured thereto. The base structure further includes a generally rectangular guide bar 30, (FIGS. 2 and 4) secured to the top of the upraised portion 24a of the base plate 24, as by the bolts 32, so as to provide a guide tongue extending parallel to the bed and drive axis of the lathe and projecting toward the cutting tool-holding means 12. The guide bar 30 is actually somewhat L-shaped, and has a leg portion 30a (FIG. 2) at its end opposite the tool-holding means 12 which extends slightly endwise of the holding means. The purpose of the leg portion 30a is to furnish a mounting tongue, in a manner to be seen subsequently.

The general shape of the cutting tool-holding means 12 is essentially that of a rectangular block, having a flat upper and lower surface. Each lateral or side surface thereof has cut-away portions, however, to serve specific purposes. Side 12a of the holding means (note FIGS. 2 and 4) has a channel-shaped slot 13 formed horizontally therein for cooperation with the guide bar 30 in providing a cooperative tongue and groove means. This serves to guide sliding movement of the holding means 12 upon the base plate 24 in a direction parallel to the workpiece 20 or drive axis of the lathe. The front side surface 12b of the holding means 12 (i.e., that side nearest the headstock and chuck 22, best seen in FIGS. 3 and 4) has a horizontal channel formed therein having an arcuate bottom surface (FIG. 4), upon which rests a similarly arcuate rocker pad 34. The rocker pad is used to position the cutting tool 36, which is held in place thereagainst by bolts 38 extending from the top of the holding means 12 into the cutting tool channel, and directly against the cutting tool, to provide a clamping means for securing same in place. Side 12c of the holding means 12 (adjacent the workpiece 20, best seen in FIG. 4) preferably has a second cutting tool groove or channel formed therein, for mounting tools used to make interior cuts in the workpiece, as will be familiar to those skilled in the art of lathes and their operation. This groove preferably has a somewhat V-shaped bottom surface (FIG. 4) in order to better accommodate such cutting tools, which frequently are cylindrical or have rounded bottom surfaces.

The rearward side 12d of the tool-holding means 12 (i.e., that side opposite the cutting tool 36) has a cylindrically-shaped recess 40 formed therein (FIGS. 2, 3 and 4) defining a generally cylindrical hub 42 (FIG. 3) within the interior of the block forming the holding means 12. Hub 42 has a threaded hole 44 formed therein, which may extend forward through the remainder of the block 12 and into the cutting tool-holding channel slot formed in side 12b thereof.

A retaining structure 46 (FIGS. 2 and 3) forming a part of the base structure assembly 10 and having a hollow cylindrical protruding end 47 is provided, for engagement of the cylindrical end 47 within the cylindrical recess 40 of the holding means 12. That is, at least one end of the retaining structure 46 has a cylindrical configuration arranged to slide into the recess 40, and the interior of the retaining structure has its own cylindrical recess 48 (FIG. 3), whose diameter is slightly larger than the diameter of the hub 42 formed in the tool-holding block 12. The retaining structure recess 48 does not extend completely through the said structure, however, but instead a solid base 49 is left at the bottom of the recess 48, such that a coil compression spring 50 may be fitted between the base 49 and the end surface of the hub 42 of the tool-holding block 12, as shown.

A connecting bolt means 52 passes through an appropriate aperture formed through the base 49 of the retaining structure 46 and through the center of the spring 50, to thread into the threaded aperture 44 in the hub 42 of the tool-holding block 12. The bolt means 52 has an external head which is sufficiently large to abut against the outer end of the retaining structure 46. The external end of the bolt means 52 has a nut 54 or other similar structure secured thereto, forming a threaded aperture into which one end of the stop means 18 may be joined. As the figures illustrate, the stop means 18 is an elongated element in the nature of a rod, having one end which is appropriately threaded to engage the nut 54.

As stated, the forward portions of the exterior of the retaining structure 46 (i.e., facing the tool-holding means 12) are cylindrically shaped, so as to fit within the recess 40 of the latter. The rearward exterior periphery of the retaining structure 46 has a laterally-extending portion 46a (FIGS. 1, 2 and 3) which is arranged to meet the leg portion 30a of the guide bar 30 seen previously. Portions 30a and 46a are fixedly secured together, as by welding, so as to vertically support the retaining structure 46 (in cooperation with the bolt means 52) with its cylindrical forward extremities 47 in concentric alignment with the cylindrical recess 40 of the tool-holding means 12.

The abutment means 14 identified in connection with FIG. 1, and the end of the stop means 18 associated therewith, are seen in detail in FIG. 5. The abutment means 14 is a somewhat elongated plate structure, which is securable to the lathe so as to extend substantially normal to the bed or drive axis thereof, in the manner indicated in FIG. 1. More specifically, the abutment means 14 has an aperture 56 formed near one end thereof and has a space 58 leading from the said aperture to the said end. By adjustment of a bolt 60 passing downwardly through the space 58, the effective diameter of the aperture 60 may be varied. Thus, the abutment means 14 may be clamped onto a convenient fixed portion of the lathe, preferably the tailstock spindle 16 seen in FIG. 1, to fixedly mount the abutment means 14 relative to the lathe. The abutment means 14 also has an elongated aperture or slot 62 formed therethrough which is alignable with the rearwardly-extending rod element forming stop means 18, which passes therethrough. As FIG. 5 illustrates, the stop means 18 terminates with an enlarged head portion 64, which is larger than the slot or aperture 62, and which will come into direct abutment with one side of the abutment plate 14 when the rod 18 is drawn therethrough a sufficient amount.

OPERATION

Having now described in detail the structure and assembly of the present novel cutting tool mounting apparatus, its use and operation is as follows. With a desired workpiece 20 fixed in the lathe, with the abutment means 14 engaged with the tail stock of the lathe, and with the base structure 10 (carrying the cutting tool-holding means 12) mounted upon the carrier of the lathe, the carrier is moved so as to position the cutting tool 36 at the closest position to the lathe headstock and chuck 22 that threads are desired to be cut upon the workpiece. The abutment means 14 and the stop means 18 are then adjusted so as to bring the enlarged head portion 64 of the latter into direct contact against the abutment means 14. This is accomplished by moving the abutment means 14 relative to the tailstock 16, and also by threading the stop means 18 either into or out of the nut 54 attached to the bolt means 52 joining the cutting tool-holding block 12 and the retaining structure 46. As will be seen, this determines the maximum distance the carriage can move the cutting tool, due to the direct mechanical connection which exists between the cutting tool 36, the holding block 12, the bolt 52, the stop means 18, the abutment means 14, and the tailstock portion of the lathe.

When the aforesaid adjustment has been made, the operator moves the carriage and consequently the cutting tool rightward, toward the rear of the lathe, to the point where it is desired to begin threading the workpiece 20. The cutting tool is then moved into contact with the workpiece, and the threading operation is commenced. The lathe may be run at a very high speed throughout the thread-cutting operation, since the operator is assured that the cutting tool cannot inadvertently exceed the desired length of thread, or actually move into the chuck 22 or face plate of the lathe at the headstock thereof.

As the carriage gradually moves the base structure 10 leftward and toward the headstock portion of the lathe, the cutting tool naturally resists such lateral movement due to its engagement with the rotating workpiece. However, the motion of the carriage is transferred through the anchor plate 28 to the base plate 24, and from the latter to the guide bar 30, due to the fixed connection therebetween provided by the bolts 32. Since the retaining structure 46 is secured to the guide bar 30 at the offset leg portions 30a and 46a thereof, the motion of the lathe carriage is thus exerted upon the righward end of the coil spring 50, by the base 49 inside the retaining structure 46. This spring must be sufficiently rigid or stiff to be substantially unaffected (i.e., not perceptibly compressed) by the stresses applied to it in this manner, and the spring consequently holds the tool-holding means 12 spaced from the rearward portions of the retaining structure 46 in the position illustrated (FIGS. 2 and 3), which position represents a first nominal operating position of the cutting tool-holding means with respect to the base structure 10.

Consequently, as the lathe carriage moves the elements making up the base structure, the spring 50 causes the tool-holding means 12 and the cutting tool 36 to be moved in unison with the entire base structure. Thus, as threads are cut into the workpiece, all of the elements of the device except the abutment means 14 are steadily moved leftward, the rod element forming the stop means 18 being steadily drawn through the elongated aperture or slot 62 in the abutment means.

When the cutting tool 36 has cut the desired length of thread into the workpiece and reaches the preselected point with respect thereto, the enlarged head 64 of the stop means 18 comes into direct abutment with the abutment with the abutment means 14. Inasmuch as the cutting tool holding means 12 is in effect rigidly joined to the head 64 through the threaded connection of the stop means 18 with the bolt means 52, when the head 64 comes into contact with the abutment means 14 the tool-holding means 12 and cutting tool 36 are positively and precisely stopped, being held in place by the abutment means 14. The carriage of the lathe naturally continues to be driven until intentionally stopped by the operator. Consequently, the base structure 10 continues to be driven toward the left, thereby applying an ever-increasing load to the spring 50 and steadily compressing the same against the hub 42 of the now stationary cutting tool-holding means 12.

As the entire base structure 10 and its retaining structure 46 continue to move relative to the cutting tool-holding means 12 (which now slides relative thereto) the spring 50 is increasingly compressed and an ever-increasing gap or clearance appears between the head of the bolt means 52 and the rearward end of the retaining structure 46 (FIGS. 2 and 3). This immediately indicates to the operator of the lathe that the thread-cutting operation is ended. In connection with indicating to the lathe operator that the thread-cutting operation is completed, it is to be noted that an indicia 60 (FIGS. 1, 2 and 3) may be added to the top of the retaining structure 46, in the cylindrical portion 47 thereof, immediately adjacent the point where the latter enters ther ecess 40 formed in the tool holding means 12. Such an indicia may very conveniently take the form of a slight circular depression, having a vividly colored bit of paint or the like thereon, so as to readily catch the eye of the operator. By observing such an indicia, an operator will immediately become aware of the completion of the cutting operation, since the vivid spot will then suddenly begin to move under the edge of the tool holding means 12 and out of sight as the spring 50 is steadily compressed and the barrel-like end of the structure 46 continuously enters the recess 40 in the tool-holding means. Upon observing the sudden "disapperance" of the indicia 60, the operator will have ample time to disengage the carriage from the lathe drive mechanism, during which the cutting tool is stationary relative to the workpiece and no further cutting or possible damage to the lathe may occur. The entire thread-cutting operation is thus very considerably facilitated, since very high cutting speeds may be used for improved results, and yet the elements urgency heretofore encountered by the operator in such operations is entirely removed.

The uniqueness and desirability of the present invention will be immediately apparent to those skilled in the pertinent arts. Thread-cutting results are greatly improved, since the precise desired length of thread may be preset and this length will always be obtained with very accurate repeatability. Also, very high cutting speeds may be utilized throughout the operation, and consequently the length of time required (and hence, labor cost involved) is reduced by at least a factor or two and in most cases significantly greater amounts than this. Further, the high cutting speeds which are made possible produce a thread having an improved and preferred finish which is so smooth and regular as to suggest that a grinding operation was involved rather than a cutting one.

It is entirely possible that after having examined the foregoing disclosure, those skilled in the art may devise certain modifications and changes in the specific structures shown herein, or even further embodiments of the inventive concept underlying the specific preferred embodiment shown and described hereinabove. All such modifications, changes, and further embodiments as incorporate the concepts underlying the invention and are clearly within its spirit are thus to be considered as within the scope of the claims appended herebelow, unless these claims by their language specifically state otherwise.

I claim:

1. A cutting tool mounting apparatus for lathes and the like for providing high speed thread-cutting operation thereof, comprising in combination: a base structure securable to the carriage portion of a lathe; a cutting tool holding means carried by said base structure for movement relative thereto under predetermined conditions; said base structure and tool-holding means having slidingly engageable portions forming a telescopable housing; stop means coupled to said tool-holding means; abutment means securable to predetermined portions of such lathe so as to be aligned with and fixed relative to said stop means; and structure within said housing and between said tool-holding means and said base structure for holding the former in a first nominal operating position relative to the latter until a predetermined force is applied therebetween and thereafter yielding to allow the aforesaid relative movement; normal driven movement of said carriage portion moving said base and said tool-holding means simultaneously in said first nominal operating position until said stop means is brought into contact with said abutment means to produce said predetermined force, whereupon said yielding occurs and said base continues to be driven with said carriage while said tool-holding means is held stationary by the said abutment means, to produce said relative movement.

2. The cutting tool mounting apparatus defined in claim 1, wherein said yieldable structure within said housing includes at least one spring element, and said predetermined force corresponds to the force producing elastic deformation of such spring element.

3. The cutting tool mounting apparatus defined in claim 1, wherein said abutment means includes an elongated element positionable to extend outward from said lathe generally normally thereof, and said stop means includes an elongated element extending from said tool-holding means toward said abutment means and generally normal thereto; at least one of said means being adjustable relative to the other to vary the distance therebetween.

4. The cutting tool mounting apparatus defined in claim 3, wherein said abutment means comprises a plate adjustably securable to the tailstock portion of said lathe.

5. The cutting tool mounting apparatus defined in claim 4, wherein said plate has an aperture therethrough and said stop means comprises a rod element extending through said aperture and having an enlarged head with an effective diameter larger than that of said aperture; said head arranged to contact said plate when said rod is drawn through said aperture by movement of said tool-holding means.

6. The cutting tool mounting apparatus defined in claim 2, wherein said abutment means includes an elongated element positionable to extend outward from said lathe generally normally thereof, and said stop means includes an elongated element extending from said tool-holding means toward said abutment means and generally normal thereto; at least one of said means being adjustable relative to the other to vary the distance therebetween.

7. The cutting tool mounting apparatus defined in claim 5, wherein said yieldable structure within said housing includes at least one spring element, and said predetermined force corresponds to the force producing elastic deformation of such spring element.

8. The cutting tool mounting apparatus defined in claim 7, wherein said tool-holding means includes a block having clamping means for securing a cutting tool thereto; said block slidably resting upon first portions of said base structure; said base structure having other portions immovably fixed to said first portions, positioned laterally of said block, and aligned horizontally therewith; said block and said other portions defining cooperating relatively slideable tongue and groove means therebetween for guiding relative sliding movements between said block and said base structure; and said spring element being located between a surface of said block and a surface of said aligned other portions to be compressed therebetween upon sliding movement of said block upon said first base structure portions.

9. The cutting tool mounting apparatus defined in claim 8, wherein said spring element is a single coil spring, and said stop means rod element is coupled to said tool-holding block and extends from the latter through said coil along the longitudinal axis thereof and beyond said aligned base structure other portions.

References Cited

UNITED STATES PATENTS 2,637,237  5/1953  Montgomery _____ 82—24

LEONIDAS VLACHOS, *Primary Examiner.*